(12) United States Patent
Makris et al.

(10) Patent No.: US 7,495,994 B2
(45) Date of Patent: Feb. 24, 2009

(54) CONTINUOUS, CONTINENTAL-SHELF-SCALE MONITORING OF FISH POPULATIONS AND BEHAVIOR

(75) Inventors: Nicholas C. Makris, Cambridge, MA (US); Purnima Ratilal, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 124 days.

(21) Appl. No.: 11/448,609

(22) Filed: Jun. 7, 2006

(65) Prior Publication Data

US 2006/0280030 A1    Dec. 14, 2006

Related U.S. Application Data

(60) Provisional application No. 60/688,619, filed on Jun. 8, 2005.

(51) Int. Cl.
*G01S 15/96*    (2006.01)
(52) U.S. Cl. ........................................ 367/11
(58) Field of Classification Search ............... 367/7, 367/11, 90, 100, 117, 118, 129, 131, 134
See application file for complete search history.

(56) References Cited

U.S. PATENT DOCUMENTS

| | | | |
|---|---|---|---|
| 4,446,542 A | | 5/1984 | Beckerle |
| 4,661,938 A | * | 4/1987 | Jones et al. ................. 367/123 |
| 5,410,519 A | * | 4/1995 | Hall et al. .................... 367/127 |
| 5,561,641 A | * | 10/1996 | Nishimori et al. ............. 367/90 |
| 6,346,079 B1 | * | 2/2002 | Haider et al. ................ 600/443 |
| 6,510,107 B2 | | 1/2003 | Diachok |
| 2003/0088182 A1 | * | 5/2003 | He et al. ...................... 600/446 |
| 2006/0225509 A1 | | 10/2006 | Haupt et al. |
| 2006/0280030 A1 | * | 12/2006 | Makris et al. ................. 367/11 |

FOREIGN PATENT DOCUMENTS

WO    WO 2006133304 A2 * 12/2006

OTHER PUBLICATIONS

Muiño, et al., "The characterization of sardine (Sardina pilchardus Walbaum) schools off the Spanish-Atlantic coast", ICES Journal of Marine Science, vol. 60, pp. 1361-1372.*

Petitgas, "A method for the identification and characterization of clusters of schools along the transect lines of fisheries-acoustic surveys", ICES Journal of Marine Science, vol. 60, No. 4, 2003, pp. 872-884.*

Arvelo, et al., "Reverberation Rejection via Modeforming with a Vertical Line Array", IEEE Journal of Oceanic Engineering, vol. 22, No. 3, Jul. 1997, pp. 541-547.*

(Continued)

*Primary Examiner*—Dan Pihulic
(74) *Attorney, Agent, or Firm*—Goodwin Procter LLP

(57) ABSTRACT

Areal population density and detailed behavior of fish schools and their interaction are continuously monitored over continental-shelf-scale areas spanning thousands of square kilometers by ocean acoustic-waveguide remote sensing. In some embodiments, the capacity of certain geophysical environments, such as continental shelves, islands, etc. to behave as acoustic waveguides is utilized; sound propagates over long ranges via trapped modes that suffer only cylindrical spreading loss, rather than the spherical loss suffered in conventional sonar approaches.

68 Claims, 2 Drawing Sheets

OTHER PUBLICATIONS

Chestnut, et al., "An aspect-independent sonar target recognition method", Journal of the Acoustical Society of America, vol. 70, No. 3, Sep. 1981, pp. 727-734.*
Stanton, et al., Sonar Echo Statistics as a Remote-Sensing Tool: Volume and Seafloor, IEEE Journal of Oceanic Engineering, vol. OE-11, No. 1, Jan. 1986, pp. 79-96.*
Ching, et al., "Wideband students of shallow-water acoustic attenuation due to fish", Journal of Sound and Vibration, vol. 18, No. 4, 1971, pp. 499-510.*
Solow, "Detecting Change in the Composition of a Multispecies Community", Biometrics, vol. 50, No. 2, Jun. 1994, pp. 556-565.*
Soria, et al., "Analysis of vessel influence on spatial behaviour of fish schools using a multi-beam sonar and consequences for biomass estimates by echo-sounder", ICES Journal of Marine Science, vol. 53, 1996, pp. 453-458.*
Abrosimov et al., "Tomographical Reconstruction of Oceanic Inhomogeneities: Part 2—Applications of Partically Coherent Acoustic Wave Structures to Fresnel Diffraction and Differential Tomography." Oceans, '95. MTS/IEEE. Challenges of our Changing Global Environment. Conference Proceedings. San Diego, CA., USA. Oct. 9-12, 1995. vol. 3, (Oct. 9, 1995), pp. 1476-1482.
International Search Report mailed Nov. 13, 2006, by the International Searching Authority in PCT Application No. PCT/US2006/022143 (5 pages).
Makris et al., "Continuous Wide Area Monitoring of Fish Shoaling Behavior with Acoustic Waveguide Sensing and Bioclutter Implications", J. Acoust. Soc. Am., vol. 115, No. 5, Pt. 2, May 2004, p. 2619.
Makris et al., "Fish Population and Behavior Revealed by Instantaneous Continental Shelf-Scale Imaging", Science, vol. 311, Feb. 3, 2006, pp. 660-663.
Masahiko Furusawa, "Designing Quantitative Echo Sounders", Journal of the Acoustical Society of America, AIP/Acoustical Society of America, Melville, NY, US, vol. 90, No. 1, Jul. 1999, pp. 26-36.
Ratilal et al., "Fish Population Dynamics Revealed by Instantaneous Continental-Shelf Scale Acoustic Imaging", J. Acoust. Soc. Am., vol. 117, No. 4, Pt. 2, Apr. 2005, p. 2382.
Ratilal et al., "Long Range Acoustic Imaging of the Continental Shelf Environment: The Acoustic Clutter Reconnaissance Experiment 2001," J. Acoust. Soc. Am. 117 (4), Pt. 1, Apr. 2005, pp. 1977-1998.
Wijk, K. van, "Toward Noncontacting Seismology", Geophysical Research Letters, vol. 32, L01308, 2005, pp. 1-4.
Written Opinion of the International Searching Authority mailed Nov. 13, 2006, by the International Searching Authority in PCT Application No. PCT/US2006/022143 (7 pages).
Makris, N. "The effect of saturated transmission scintillation on ocean acoustic intensity measurements" J. Acoust. Soc. Am. 100 (2), Pt. 1, 769-783 Aug. 1996.
Makris, N. "A foundation for logarighmic measures of fluctuating intensity in pattern recognition" from Optics Letters, 2012-2014 Apr. 10, 1995.
Makris, et al. "A unified model for reverberation and submerged object scattering in a stratified ocean waveguide" J. Acoust. Soc. Am. 109 (3), 909-941 Mar. 2001.
Makris, et al. "Deterministic reverberation from ocean ridges" J. Acoust. Soc. Am. 97 (6), 3547-3574 Jun. 1995.
Makris, et al. "Detection of a submerged object insonified by surface noise in an ocean waveguide" J. Acoust. Soc. Am. 96 (3), 1703-1724 Sep. 1994.
Ratilal, et al. "Long range acoustic imaging of the continental shelf environment: The Acoustic Clutter Reconnaissance Experiment 2001" J. Acoust. Soc. Am. 117 (4) Pt. 1, 1977-1998 Apr. 2005.
Ratilal, et al. "Validity of the sonar equation and Babinet's principle for scattering in a stratified medium" J. Acoust. Soc. Am. 112 (5), Pt. 1, 1797-1816 Nov. 2002.
Ratilal et al. "Mean and covariance of the forward field propagated through a stratified ocean waveguide with three-dimensional random inhomogeneities" J. Acoust. Soc. Am. 118 (3), Pt. 1, Sep. 1-28, 2005.
Rusby, et al. "An Experimental Survey of a Herring Fishery by Long-Range Sonar" Marine Biology 22, 271-292 (1973).
Weston et al. "Fish Echoes on a Long-Range Sonar Display" J. Sound Vib. (1971) 17 (1), 105-112.
Chen et al., "Mean and Variance of the Forward Field Propagated Through Three-Dimensional Random Internal Waves in a Continental-Shelf Waveguide," J. Acoust. Soc. Am. 118 (6), Dec. 2005, pp. 3560-3574.
Examination Report for corresponding European Patent Application No. 06784640.2, dated May 16, 2008, 4 pages.

* cited by examiner

CONTINUOUS, CONTINENTAL-SHELF-SCALE MONITORING OF FISH POPULATIONS AND BEHAVIOR

RELATED APPLICATION

This application claims the benefits of and priority to U.S. Provisional Application Ser. No. 60/688,619 (filed on Jun. 8, 2005), the entire disclosure of which is hereby incorporated by reference.

GOVERNMENT SUPPORT

This invention was made with government support under Grant Number N00014-99-1-1059, awarded by the U.S. Navy. The government has certain rights in the invention.

BACKGROUND

Fish stocks are declining worldwide, yet conventional approaches to studying fish abundance and behavior rely heavily on imprecise local sonar and capture-trawling measurements. In particular, fish in continental-shelf environments have been monitored by line-transect techniques from slow moving research vessels; these techniques significantly under-sample fish populations in time and space, leaving an incomplete abundance and behavioral picture. Conventional fish-finding sonar (CFFS) operates in the 10-500 kHz range and measures the local depth distribution of fish by echo sounding within a narrow, downward-directed beam along the line transect of a slowly moving research vessel. Typically systems survey habitats at rates in the vicinity of 0.2 km$^2$/hour, which is similar to the survey rates of capture-trawl vessels. Survey rates can increase by roughly an order of magnitude with conventional side-scan sonar, which exploits only local, linear, waterborne propagation paths. In contrast, isolated fish schools are often widely separated in space and difficult to detect by conventional methods. Small schools spanning hundreds of meters in diameter are known to undergo rapid variation in size and shape. Larger schools often extend over tens to hundreds of square kilometers and can also undergo drastic morphological changes, including fragmentation and clustering, in periods less than one hour.

Consequently, measurement of the size, spatial distribution, and temporal evolution of fish schools is generally not practical with conventional methods. The fish are too widely dispersed and, during the course of a measurement using CFFS, their spatial concentrations and distributions change dramatically.

SUMMARY OF THE INVENTION

The present invention permits the areal population density and detailed behavior of fish schools and their interaction to be continuously monitored at short (e.g., roughly one-minute) intervals over continental-shelf-scale areas spanning thousands of square kilometers by ocean acoustic-waveguide remote sensing. This is possible because the present invention relies upon the capacity of certain geophysical environments, such as continental shelves, islands, etc. to behave as acoustic waveguides where sound propagates over long ranges via trapped modes that suffer only cylindrical spreading loss, rather than the spherical loss suffered in CFFS transmission. The invention can also be used in deep water away from continental shelves by relying on variations in the water-column sound speed to generate a waveguide.

To form an instantaneous image in accordance with the invention, waveguide modes may be excited uniformly in azimuth by a vertical source array employing a pulsed, preferably short broadband transmission. Scattered returns from environmental features are then continuously received by a horizontal line array and charted in horizontal range and bearing (e.g., by temporal matched filtering and beamforming). The resulting image is an instantaneous snapshot of the ocean environment over the two-way travel times of the signal returns. The invention is useful in localizing and characterizing fish with and without swim bladders, and may be applied to detect, image and localize other marine creatures such as krill.

Accordingly, in a first aspect, the invention features a method of characterizing a population of fish. The method comprises generating, within an aquatic environment, horizontally directed acoustic signals via trapped modes whereby the signals eventually undergo cylindrical spreading loss; receiving return acoustic signals stimulated or excited by the generated acoustic signals; and interpreting the return acoustic signals so as to detect and characterize the fish population. In some embodiments, the acoustic signals are pulsed. Preferably, the generated acoustic signals are azimuthally uniform and propagate within bounding geophysical features that act as a waveguide, such as the seafloor and ocean-atmosphere surface. The waveguide may also arise from variations in the watercolumn sound speed.

The interpreting step preferably comprises temporal matched filtering and beamforming; this approach charts return acoustic signal intensities to the horizontal spatial location of the scattering feature that returned them, thereby forming an image of return acoustic intensities. The step may also include compensating for two-way waveguide transmission loss, resolution footprint, fish target strength, and source power. In some embodiments, the interpreting step comprises establishing a fish target strength and, based thereon, identifying return signals indicative of fish populations. This may involve establishing target strengths of different species of fish and distinguishing among different fish populations based on the established target strengths, and establishing areal population density of the fish groups. In some embodiments, the interpreting step may also involve log-transformation of the return acoustic-signal intensities to convert return-signal-dependent speckle noise into return-signal-independent additive noise, thereby optimizing pattern recognition of fish target strength or population distributions.

The characterization typically (although not necessarily) occurs over a region having an area in excess of 25 km$^2$. The generated acoustic signals desirably propagate, and the return acoustic signals span, 360 degrees in azimuth. They may be generated from a vertically oriented array of acoustic sources disposed within the aquatic environment. A horizontal aperture in the source array may be used to direct the generated acoustic signals to certain preferred azimuths in some embodiments.

Steps may be taken to optimize the wavelength of the acoustic signals. For example, the optimized wavelength may be large enough that the return acoustic signals are expressible as the product of (i) a factor representing transmission to a fish, (ii) a factor representing scattering from the fish, and (iii) a factor representing transmission from the fish. The optimized wavelength may be such that a far-field range of the acoustic signals is shorter than a mean spacing between fish to be characterized. In some embodiments, the optimized wavelength is such that a shadow length from fish to be characterized is smaller than the mean distance between the fish. The optimized wavelength may be chosen so that return acoustic signals are independent of the aspect of any individual fish. The optimized wavelength may be chosen so that the total acoustic attenuation caused by waveguide scattering (many incident angles in and out) from fish or fish groups is less than 1 dB. (CFFS systems typically operate at much higher frequency and can have significant attenuation in propagating through even small schools of fish, leading to significant errors in population estimation.) The optimized wavelength and acoustic signal power level may be chosen such that return acoustic signals from fish exceed an ambient noise level at a maximum detection range by at least 5 dB. The maximum detection range may exceed tens of kilometers or more. The optimized acoustic wavelength may be chosen such that scattering from fish groups or other marine creatures exceeds seafloor scattering at the maximum detection range.

Measures may be taken to optimize the waveguide modes stimulated by the source array to maximize return acoustic signals from fish and to minimize return acoustic signals from the seafloor.

In some embodiments, successive images of returned acoustic signal intensity, fish target strength or areal population density, may, if desired, be concatenated into a movie.

The invention may characterize a total area occupied by a detected fish group, and identify a center of population of the fish group. This, in turn, may be used to detect a velocity of the fish group by time differencing the identified center of population. The velocity vectors of an entire field of fish may also be determined by time and space differencing following conservation of mass, and the environmental pressures on the fish causing them to move may also then be quantified following conservation of momentum. Alternatively, the velocity of a fish group may be estimated based on a Doppler frequency shift of the return acoustic signals.

In another aspect, the invention features an apparatus for characterizing a population of fish. The apparatus comprises a transmission device for generating, within an aquatic environment, horizontally directed acoustic signals via trapped modes whereby the signals undergo cylindrical spreading loss; a receiver for receiving return acoustic signals stimulated by the generated acoustic signals; and an analysis module for interpreting the return acoustic signals so as to detect and characterize the fish population. This may be accomplished in real time or by subsequent analysis.

The transmission device desirably generates azimuthally uniform acoustic signals, which ideally propagate 360 degrees in azimuth, and which may be pulsed. In some embodiments, the analysis module interprets the return acoustic signals by temporal matched filtering and beamforming. The transmission device may, for example, comprise a vertically oriented array of acoustic sources. The array of sources may transmit a spatially filtered signal to optimize return acoustic signals from fish or marine creatures and minimize return acoustic signals from the seafloor. Desirably, the generated signals have a wavelength and power level jointly optimized such that return acoustic signals from fish exceed an ambient noise level at a maximum detection range by at least 5 dB.

The analysis module may be configured to compensate for two-way waveguide transmission loss, resolution footprint, fish target strength, signal-dependent noise and source power. In some embodiments, the analysis module is configured to establish a fish target strength and, based thereon, to identify return signals indicative of fish populations. In this regard, the analysis module may be further configured to establish target strengths of different species of fish and to distinguish among different fish populations based on the established target strengths, and to establish areal population density of the fish groups. In some embodiments, the analysis module is configured to optimize a wavelength of the acoustic signals as described above.

The analysis module may be configured to characterize the total population of fish in a given area and the variations of this population with time. The analysis module may be configured to characterize a total area occupied by a detected fish group and, if desired, a center of population of the fish group. The analysis module may be further configured to detect a velocity of the fish group by time differencing the identified center of population. The analysis module may be still further configured to determine velocity vectors of an entire field of fish by time and space differencing following conservation of mass, as well as the environmental pressures on the fish causing them to move using conservation of momentum. Alternatively, the analysis module may estimate a velocity of a fish group based on a Doppler frequency shift of the return acoustic signals.

The apparatus may also include image-processing module for generating images of a fish population based on the return acoustic signals. The image processing module may be configured to establish the spatial spectrum of fish population. The image-processing module may, if desired, be configured to concatenate successive images into a movie. The image processing module may, if desired, be configured to estimate time series of fish population, fish group area, fish major and minor axes within a given region, as well as the spectrum and correlation lengths of these time series.

BRIEF DESCRIPTION OF THE DRAWINGS

The foregoing discussion will be understood more readily from the following detailed description of the invention when taken in conjunction with the accompanying drawings, in which.

DETAILED DESCRIPTION

1. Basic Approach

Figure 1:
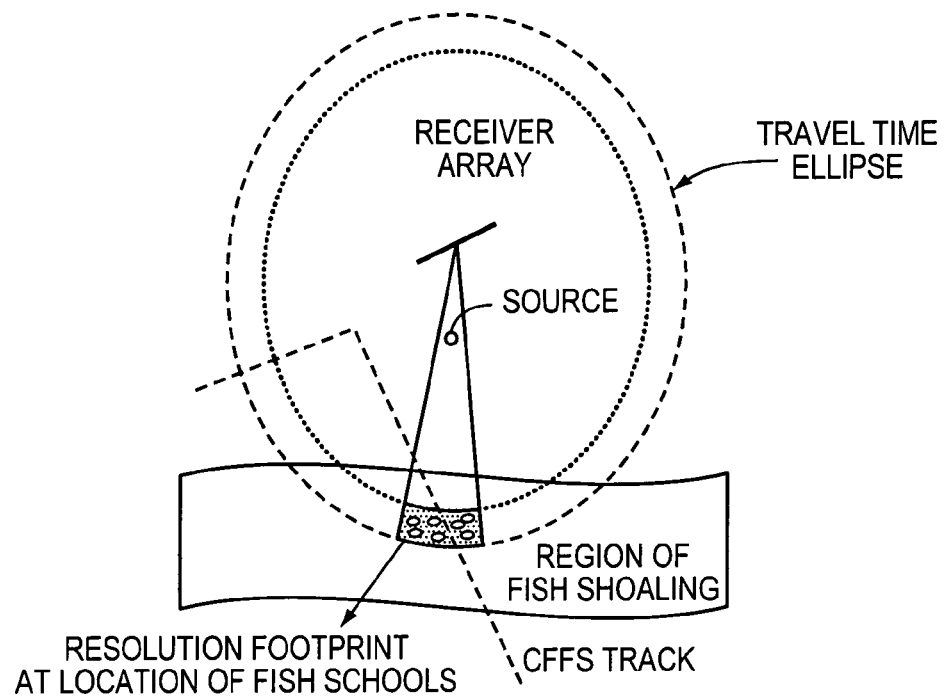
FIG. 1 schematically illustrates the imaging field of a system in accordance with the present invention, as contrasted with a CFFS track.

In an exemplary implementation, the location of the source and receiver are known, and the time of source transmission is known. Scattered returns from environmental features such as fish are then continuously received by a horizontal line array and charted in horizontal range and bearing, preferably by temporal matched filtering and beamforming using the known propagation speeds of acoustic modes in the ocean (e.g., as determined from local sound speed measurements). The resulting image is an instantaneous snapshot of the ocean environment over the two-way travel times of the signal returns spanning 360 degrees in azimuth. Each pixel in such a raw image has units of sound pressure level in decibels relative to a reference pressure. The range resolution is fixed at the mean sound speed, $c=1475$ m/s, divided by twice the signal bandwidth. Azimuthal resolution in radians varies as the acoustic wavelength $\lambda$ divided by the projected array length $L\cos\theta$, where L is the full array length and the azimuth angle $\theta$ is zero at broadside, which is normal to the array axis. At endfire, parallel to the array axis, the resolution becomes roughly $$\sqrt{\frac{2\lambda}{L}}$$

radians. FIG. 1 gives a horizontal view of the resolution and contrasts this with a CFFS line transect. As shown in FIG. 1, the array does not have left-right ambiguity about its axis because the array has some aperture normal to its long axis to give two-dimensionality to the aperture and thereby eliminate this ambiguity, e.g., as in a cardiod array or towing of multiple-line arrays. For a single-line array, with no aperture normal to the array's axis, ambiguity may be resolved both by changing the receiver array position and orientation. The endfire beam in the direction of tow is sometimes not useful for environmental imaging since it is sometimes contaminated with noise from the tow-ship.

A variety of source waveforms can be used, including linear frequency modulated (lfm), hyperbolic frequency modulated (hfm), and sinusoidal or constant wave (cw) sequences of pulses. The frequency-modulated waveforms, such as lfms and hfms, are advantageous because they enable pulse compression or matched-filter techniques to be used that improve range resolution, single-to-noise ratio, and signal-to-background reverberation ratio.

The transmission repeat rate puts a limit on the range coverage. A 50-second repeat rate corresponds to roughly 30-km radius coverage for each instantaneous image, while a 100-second repeat rate corresponds to roughly 60-km radius coverage, leaving some non-record time between the previous reception and the next transmission to obtain optimal acquisition. Both 50- and 100-second repeat rates have been used to advantage.

2. Equipment

Figure 2:
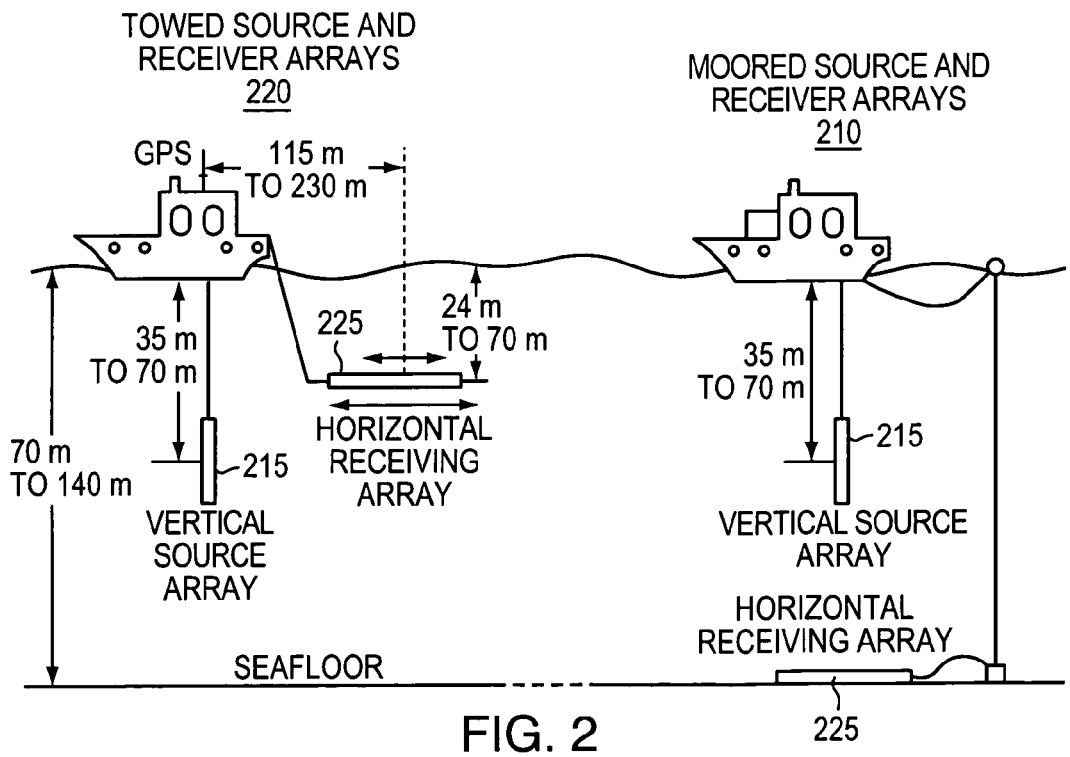
FIG. 2 schematically illustrates a deployment of the present invention.

A typical implementation is shown in FIG. 2. A moored, towed or drifting source array 210 utilizes one or more vertical linear arrays 215 each of which contains one or more underwater acoustic sources, sending sound out over 360 degrees in horizontal azimuth. Waveguide modes are excited by vertical source array 215, which is suspended, for example, 35-70 m below the tow vessel. The source array employs a spatial window to stimulate modes that will maximize returns from fish and minimize returns from the seafloor. A moored, towed or drifting receiver array 220 includes one or more horizontal linear receiving arrays 225 of hydrophones (each array preferably containing multiple hydrophones to enable the direction of underwater acoustic waves to be determined). In the example shown in FIG. 2, this is suspended, for example, 24-55 m below and 115-230 m behind another research vessel. Scattered returns are received by horizontal receiving array 225. In general, the sources and receivers may be towed from moving research vessels or they may be moored to the seafloor. Typical seafloor depths range from 70 m to 140 m in this example.

Deployable arrays of acoustic sources or receivers can take any suitable form as well known in the art. A typical array includes a buoyancy package, a connecting line or cable, a cable release, a depth sensor, and a pressure case that houses the sources or receivers, as well as associated control electronics. The buoyancy package may, for example, comprise a buoy or float that serves to support the array in an upright vertical or horizontal orientation. Multiple depth sensors are typically employed, but if a single one is used it is generally positioned close to the array and, in the case of the receiver array, is also electrically connected to the control system so that depth information is conveyed for analysis along with acoustic signals.

Figure 3:
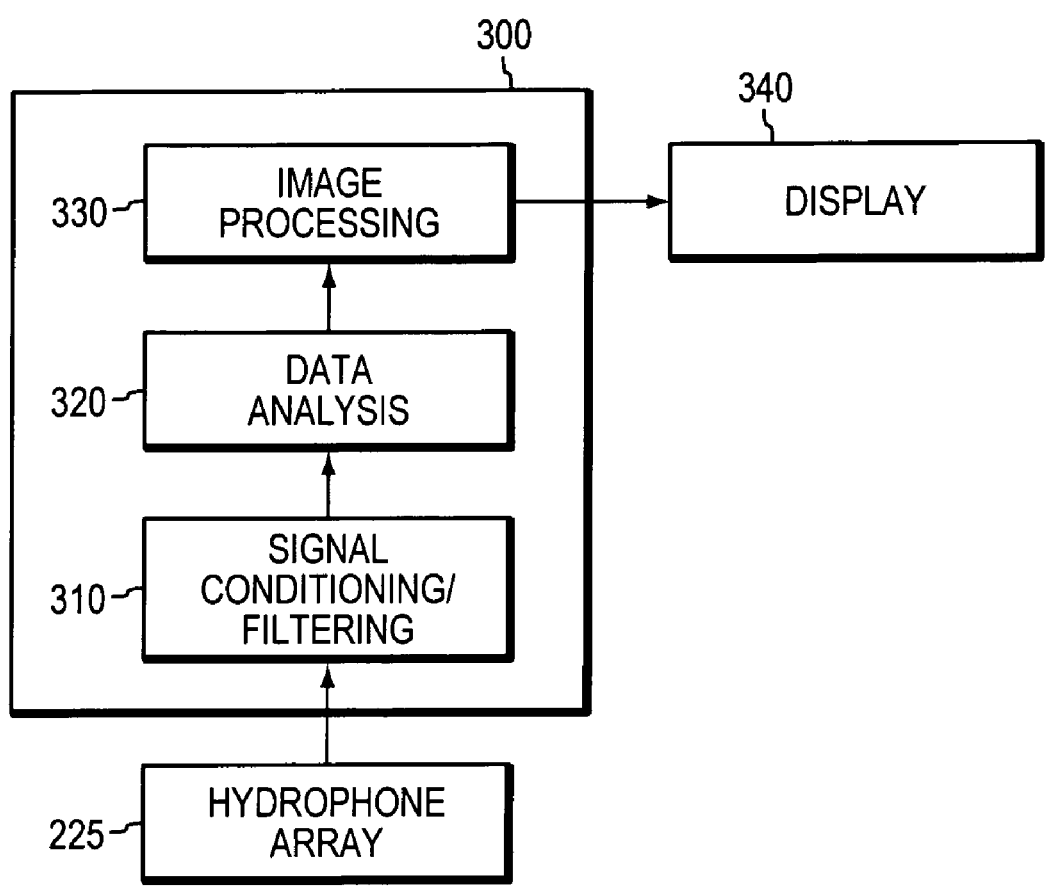
FIG. 3 schematically illustrates a data-processing system in accordance with the present invention.

With reference to FIG. 3, a system 300 for processing signals from receiver array 225 in accordance with the invention is conceptually organizes as a series of functional modules including a signal conditioning and filtering module 310, which, in accord with conventional practice, reduces noise and improves underwater acoustic data; a data-analysis module 320, which analyzes conditioned, digitized signals to form images in range by temporal matched filtering and in azimuth by planewave beamforming; and, if desired, an image-processing module 330 to assemble or further process the images output by data-analysis module 320. The images may be displayed on a computer display 340. The present invention uses sound less intense than CFFS, typically by more than three orders of magnitude. The obtainable range resolution is $$\Delta r = \frac{c}{2B}$$

where c is the mean ocean sound speed during an experiment, and B is the bandwidth of transmitted signals.

Modules 320, 330 can be implemented in whole or in part as a software program using any suitable programming language or languages (C++, C#, java, FORTRAN, LISP, BASIC, PERL, etc.) and/or as a hardware device (e.g., ASIC, FPGA, processor, memory, storage and the like). The functions performed by modules 320, 330 are described in greater detail below.

2. Mode Filtering with the Source Array

The vertical source array can be designed to filter the modes stimulated and propagated into the waveguide. This is done by shading the amplitude and phase of each individual element of the source array during signal transmission. Typically it is preferable to stimulate lower-order modes of the water column with the source array, since these have wavenumber vectors with more horizontal orientation and so interact less, or are incident with shallower angles on the seafloor and seasurface, thereby minimizing returns from seafloor and seasurface inhomogeneities and features. These lower modes still fill the water column and yield strong returns from fish populations.

Lower-order modes may also be stimulated by advantageous placement of the source array in an environment with known bathymetry. Placement of the source array in shallower bathymetry can sometimes be advantageous since fewer modes are excited, and these are at the lower end. As a result, when these modes travel into deeper water, incident angles on the seafloor and seasurface will be shallower than if the source had been placed in deeper water, so returns from the seafloor and seasurface will again be minimized.

3. Deriving Target Strength of a Unit Area and Population Density

The typical output of data-analysis module 320 is typically one or more images of the target strength of a unit area of the ocean environment, including fish schools and other aquatic life. These are determined by compensating the received sound pressure-levels for (i) two-way transmission loss in the range-dependent continental-shelf waveguide (using, for example, parabolic equation modeling as described, for example, in Makris et al., *Science* 311:660-663 (2006) including the supporting online material)); (ii) the spatially varying resolution footprint of the OARS source-receiver system; (iii) fish target strength; and (iv) source power.

3.1. Ocean Acoustic Waveguide Scattering Model for a General Target

For illustrative purposes, we describe a normal mode formulation for the scattered field from a general target in a stratified ocean waveguide. Let the origin of the coordinate system be placed at the air-water interface with the positive z-axis pointing downward. Let the coordinates of the source be defined by $r_0=(x_0, y_0, z_0)$, the receiver coordinates by $r=(x, y, z)$, and the coordinates of the centroid of a target by $r_t=(x_t, y_t, z_t)$. Spatial cylindrical $(\rho, \phi, z)$ and spherical systems $(r, \theta, \phi)$ are defined by $x=r \sin\theta \cos\phi$, $y=r \sin\theta \sin\phi$, $z=r\cos\theta$ and $\rho^2=x^2+y^2$. The acoustic wavenumber k is given by the angular frequency $\omega=2\pi f$ divided by the sound speed c.

The time-harmonic scattered field measured by a receiver at r for a source at $r_0$ from an arbitrary target in a stratified ocean waveguide with target center at $r_t$ is given by $$\Phi_s(r|r_0, r_t, f) = \qquad\qquad\qquad\qquad\text{(Eq. 1)}$$

$$\sum_{m=1}^{M_{max}} \sum_{n=1}^{M_{max}} \frac{(4\pi)^2}{k} [A_m(r-r_t)A_n(r_t-r_0)S_{r_t}(\pi-\alpha_m, \beta(\phi, \phi_t)\alpha_n,$$

$$\beta(\phi_t, \phi_0)) - B_m(r-r_t)A_n(r_t-r_0)$$

$$S_{r_t}(\alpha_m, \beta(\phi, \phi_t), \alpha_n, \beta(\phi_t, \phi_0)) - A_m(r-r_t)$$

$$B_n(r_t-r_0)S_{r_t}(\pi-\alpha_m, \beta(\phi, \phi_t), \pi-\alpha_n, \beta(\phi_t, \phi_0)) +$$

$$B_m(r-r_t)B_n(r_t-r_0)S_{r_t}(\alpha_m, \beta(\phi, \phi_t), \pi-\alpha_n, \beta(\phi_t, \phi_0))]$$

where $A_n(r_t-r_0)$ and $B_n(r_t-r_0)$ are the amplitudes of the down- and upgoing modal plane wave components incident on the inhomogeneity at $r_t$, $A_m(r-r_t)$ and $B_m(r-r_t)$ are the amplitudes of the up- and downgoing modal components scattered from the inhomogeneity, $S_{r_t}(\pi-\alpha_m, \beta(\phi, \phi_t), \alpha_n, \beta(\phi_t, \phi_0))$ is the scatter function of the object centered at $r_t$, $$\beta(\phi, \phi_t) = \phi - \sin^{-1}\left\{\frac{\rho_t}{|\rho-\rho_t|}\sin(\phi_t-\phi)\right\}$$

is the azimuth of the receiver from the target, $\beta(\phi_t, \phi_0)$ is the azimuth of the target from the source, $\alpha_n$ are the modal elevation angles, and $M_{max}$ is the mode number at which the modal summations can be truncated and still accurately represent the field, as in P. Ratilal and N. C. Makris, *J. Acoust. Soc. Am.* 118:3532-3559 (2005). An equivalent formulation in terms of wavenumber integrals is found in N. C. Makris, F. Ingenito, and W. A. Kuperman, "Detection of a submerged object insonified by surface noise in an ocean waveguide," *J. Acoust. Soc. Am.* 96:1703-1724 (1994). The target strength of an object is $TS=10 \log_{10}|S/k|^2$ in dB re 1 m for k measured in 1/m.

For any given object in an ocean waveguide, the object scatter function couples the incident and scattered waveguide modes, so that propagation and scattering are coherently convolved as seen in Eq. 1. This coupling between propagation and scattering can be especially significant for highly directional objects, such as those large compared to the acoustic wavelength, since there will couple incident and scattered modes differently depending on their equivalent planewave directions at the object. For such highly directional objects, this coupling makes it challenging to accurately estimate the scattering function or target strength from measured return acoustic signals in an ocean waveguide, as noted in P. Ratilal, Y. Lai, and N. C. Makris, *J. Acoust. Soc. Am.* 112:1797-1816 (2002). This is a problem for CFFS operating frequencies which range above roughly 10 kHz, where individual fish tend to become highly directional scatterers. At these frequencies, there is also significant shadowing from one fish to the next and significant multiple scattering in dense fish schools. This also makes estimation of fish population densities challenging at CFFS frequencies, since the effects of shadowing and multiple scattering also need to be factored into the analysis of return acoustic signals to estimate fish target strength and population.

At the lower acoustic frequencies below 10 kHz, most fish become acoustically compact, small compared to the acoustic wavelength. The scatter function of these fish become omni-directional for both the swimbladder as well as the body of the fish. The scatter function in Eq. 1 can then be expressed as a constant, independent of the direction of the incident and scattered modal plane waves so that $S_{r_t}(\pi-\alpha_m, \beta(\phi, \phi_t), \alpha_n, \beta(\phi_t, \phi_0)) \approx S_0(r_t, f)$ can be factored from the summations. As shown in P. Ratilal, Y. Lai, and N. C. Makris, *J. Acoust. Soc. Am.* 112:1797-1816 (2002), the scattered field simplifies to, $$\Phi_s(r|r_0, r_t, f) = \frac{(4\pi)^2}{k}G(r_t|r_0, f)G(r|r_t, f)S_0(r_t, f) \qquad \text{(Eq. 2)}$$

where waveguide propagation determined by the Green's function G to and from the scatterer become factorable and hence separable from the scatter function which depends on the target properties.

3.2 Expected Scattered Intensity from Fish within the Resolution Footprint

Let q(t) be the source signal with Fourier transform or spectrum Q(f). Then given a distribution of N fish within the sonar resolution footprint at centered at horizontal location $r_t$, where each fish is numbered by i, the frequency spectrum of the scattered field from the N fish can be expressed as a sum of those from each fish, $$\Psi_s(r|r_0, \rho_t, f) = \sum_{i=1}^{N} Q(f)\frac{(4\pi)^2}{k}G(r_i | r_0, f)G(r|r_i, f)S_0(r_i, f). \qquad \text{(Eq. 3)}$$

An ocean waveguide is temporally and spatially random due to the presence of water column internal wave fluctuations and other inhomogeneities and variations in the medium and waveguide boundaries. The random waveguide leads to temporal and spatial fluctuations in the multi-modal acoustic field propagation and hence randomness in the measured acoustic intensity. The fish contained in the resolution footprint of the present invention will also be randomly distributed in size, shape, spatial density, and other physical properties, as well as their location within the sonar resolution footprint. The measured scattered intensity within the sonar resolution footprint will then be random due to both waveguide fluctuations and randomness in fish distribution. A statistical approach is then necessary to analyze the measured acoustic data.

The mean scattered field within the sonar resolution footprint is found by taking the expected value of Eq. 3.

$$\langle \Psi_s(r|r_0, \rho_t, f) \rangle = \left\langle \sum_{i=1}^{N} Q(f) \frac{(4\pi)^2}{k} G(r_i|r_0, f) G(r|r_i, f) S_0(r_i, f) \right\rangle \quad \text{(Eq. 4)}$$

where waveguide Green functions $G(r_i|r_0, f)$, $G(r|r_i, f)$, the position $r_i$ of the ith fish, and the scatter function $S_0(r_i, f)$ of the ith fish are all raondom variables, as can be the number of fish within the resolution footprint of the system over time. Since the scatter function of the fish is independent of the waveguide Green's function, the expectation in the right hand side of Eq. 4 is factorable for these terms.

The expected squared magnitude of the scattered field spectrum within the sonar resolution footprint, proportional to intensity, is $$\langle \Psi_s(r|r_0, \rho_t, f) \Psi_s^*(r|r_0, \rho_t, f') \rangle = \quad \text{(Eq. 5)}$$

$$\left\langle \sum_{i=1}^{N} Q(f) \frac{(4\pi)^2}{k} G(r_i|r_0, f) G(r|r_i, f) S_0(r_i, f) \right.$$

$$\left. \sum_{j=1}^{N} Q(f') \frac{(4\pi)^2}{k} G^*(r_j|r_0, f') G^*(r|r_j, f') S_0^*(r_j, f') \right\rangle$$

from Eq. 3.

The expected squared magnitude of the scattered field spectrum can also be written in terms of the square of the mean, a coherent term, and the variance of the scattered field spectrum, an incoherent term, $$<|\Psi_s(r|r_0,\rho_t,f)|^2> = |<\Psi_s(r|r_0,\rho_t,f)>|^2 + \text{Var}(\Psi_s(r|r_0,\rho_t,f)) \quad \text{(Eq. 6)}$$

The mean scattered field spectrum is effectively zero, based on both theory and experimentation, since the sonar resolution footprint has dimensions that are large compared to the acoustic wavelength and the distribution of fish within the resolution footprint is random. So the coherent term vanishes.

The expected squared magnitude of the scattered field spectrum the within the sonar resolution footprint is then, $$\langle |\Psi_s(r|r_0, \rho_t, f)|^2 \rangle = \quad \text{(Eq. 7)}$$

$$\sum_{i=1}^{N} |Q(f)|^2 (4\pi)^4 \left\langle |G(r_i|r_0, f)|^2 |G(r|r_i, f)|^2 \frac{|S_0(r_i, f)|^2}{k^2} \right\rangle.$$

Randomness in the fish scattering properties is effectively independent of the ocean transmission fluctuations in the Green functions. The expected squared magnitude of the scattered field spectrum can then be written as, $$\langle |\Psi_s(r|r_0, \rho_t, f)|^2 \rangle = \quad \text{(Eq. 8)}$$

$$|Q(f)|^2 (4\pi)^4 \langle |G(r_i|r_0, f)|^2 |G(r|r_i, f)|^2 \rangle \left\langle N \frac{|S_0(r_i, f)|^2}{k^2} \right\rangle.$$

where the first parenthetical factor on the right hand describes the known source power of the present system, the second factor in the expectation value describes transmission to and from the fish which can be computed from known bathemtry and sound speed measurements, and the third factor in the last expectation value describes the total scattering cross section of the fish within the resolution footprint, $10 \log_{10}$ of which is the target strength of fish within the resolution footprint. Often the forward path and the return path are uncorrelated, especially in bistatic geometries, making the expectation of the product of magnitude squared Green functions equal the product of the expectations of the magnitude squared Green functions. Eq. 8 is typically implemented by using the Parabolic Equation to determine the Green function in a range-dependent waveguide connecting any two points in the waveguide at the given frequency.

The total scattering cross-section of the fish within the resolution footprint can then be obtained by dividing these source and transmission factors from measurements of the magnitude squared of the scattered field. If the expected scattering cross-section of a randomly selected individual fish in the group is known, the total number of fish N can be estimated by subtracting this expected cross section for an individual from the total cross section of the resolution footprint.

The expected value of the magnitude square of the Green functions is typically a very slowly varying function over depth and range in comparison to fish group distributions, especially in continental shelf environments. The expected value of the magnitude square of the Green functions can be computed using a number of methods including, for example, Monte-Carlo simulation with the parabolic equation for a range-dependent fluctuating ocean, as well as the methods in P. Ratilal, N. C. Makris, "Mean and covariance of the forward field propagated through a stratified ocean waveguide with three-dimensional random inhomogeneities," *J. Acoust. Soc. Am.* 118:3532-3559 (2005), and T. Chen, P. Ratilal, and N. C. Makris "Mean and variance of the forward field propagated through three-dimensional random internal waves in a continental-shelf wavegued," *J. Acoust. Soc. Am.* 118:3560-3574 (2005). (In many continental-shelf environments, it is also possible to simply estimate the expected value of the magnitude square of the Green function by depth averaging the magnitude square of the deterministic Green function calculated by the parabolic equation or another propagation model at the range of the sonar resolution footprint. This typically works well because randomization does not significantly change the total power transmitted through the waveguide, but rather often mixes and spreads that power relatively uniformly in depth.) Also, finite band source signals are often used so that integration of Eq. 7 or 8 over the source frequency band can on its own significantly smooths variations in the expected magnitude square of the Green function in range and depth.

3.3 Expected Scattered Intensity from General Environmental Inhomogeneites

Here we describe an approach that can be used to model the scattering from volumetric inhomogeneities in the ocean, including fish, and the sea bottom. This can be used advantageously to optimize detection of fish and minimize reverberation from the sea bottom in the resolution footprint by adjusting controllable parameters such as source frequency, source-receiver location, and source array spatial windowing/mode-filtering.

Consider a volume V in the medium imaged at horizontal location $\rho_t$ within its resolution footprint. Given inhomogeneities at locations $r_t$ within the volume with density $d_t$ and sound speed $c_t$ that differ from the surrounding medium with ambient density d and sound speed c, the field scattered from the inhomogeneities can be modeled using the first-order Rayleigh-Born approximation to Green's theorem as, $$\Psi_s(r|r_0, \rho_t, f) = \qquad \text{(Eq. 9)}$$
$$Q(f)(4\pi)^2 \int\!\!\int_{V_t}\!\!\int (k^2 \Gamma_\kappa G(r_t|r_0, f) G(r|r_t, f) + \Gamma_d \nabla G(r_t|r_0, f) \cdot$$
$$\nabla G(r|r_t, f)) dV_t$$

where $\kappa = dc^2$ is the compressibility, $$\Gamma_\kappa = \frac{\kappa_t - \kappa}{\kappa}$$

is the fractional difference in compressibility, and $$\Gamma_d = \frac{d_t - d}{d_t}$$

is the fractional difference in the density of the inhomogeneities relative to the background medium.

Since the inhomogeneities are randomly distributed in their physical and acoustical scattering properties, a statistical approach is desirable. The expected squared magnitude of the scattered field spectrum from the volumetric inhomogeneities can be written, as in Eq. 6, as the sum of a coherent and an incoherent term. The coherent term is the square of the mean scattered field. The mean scattered field is given by, $$\langle \Psi_s(r|r_0, \rho_t, f) \rangle = \qquad \text{(Eq. 10)}$$
$$Q(f)(4\pi)^2 \int\!\!\int_{V_t}\!\!\int (k^2 \langle \Gamma_\kappa \rangle \langle G(r_t|r_0, f) G(r|r_t, f) \rangle +$$
$$\langle \Gamma_d \rangle \langle \nabla G(r_t|r_0, f) \cdot \nabla G(r|r_t, f) \rangle) dV_t$$

As with scattering from fish within the resolution footprint, the coherent term is negligibly small for scattering from the sea bottom. The mean square values of $\Gamma_\kappa$ and $\Gamma_d$ are typically much smaller (by two orders of magnitude) than their variances and their covariance. The latter parameters are obtained by direct measurement, acoustic inversion, or inference. The expected squared magnitude of the scattered field spectrum within the sonar resolution footprint is then given by the incoherent term which is the variance of the scattered field as, $$\langle |\Psi_s(r|r_0, \rho_t, f)|^2 \rangle = |Q(f)|^2 (4\pi)^4 \qquad \text{(Eq. 11)}$$
$$\int\!\!\int_{V_t}\!\!\int V_c(k^4 \text{Var}(\Gamma_\kappa) \langle |G(r_t|r_0, f)|^2 |G(r|r_t, f)|^2 \rangle +$$
$$\text{Var}(\Gamma_d) \langle |\nabla G(r_t|r_0, f) \cdot \nabla G(r|r_t, f)|^2 \rangle +$$
$$\text{Cov}(\Gamma_\kappa, \Gamma_d) \langle 2\Re\{G(r_t|r_0, f) G(r_t|r_0, f) \nabla G^*(r_t|r_0,$$
$$f) \cdot \nabla G^*(r|r_t, f)\} \rangle) dV_t,$$

where $V_c$ is the coherence volume for the 3D random inhomogeneities.

Eq. 11 is typically implemented by using the Parabolic Equation to determine the Green function in a range-dependent waveguide connecting any two points in the waveguide at the given frequency.

3.4 Scatter Functions for Fish and Air-Filled Bubbles

Here we describe some typical scatter functions that can be used to model the scattered field from fish with Eqs. 7 or 8 or bubbles in the ocean.

For fish with swimbladders, a dominant source of scattering is often that air-filled organ. When acoustically compact, their scatter function or target strength can be modeled using the target strength formulation of an equivalent bubble of the same volume $$\frac{|S_0(r_i, f)|^2}{k^2} = \frac{a^2}{(f_r^2/f^2 - 1) + \delta^2} \qquad \text{(Eq. 12)}$$

where $\alpha$ is the swimbladder radius, $f_r$ is the resonance frequency of the swimbladder, and $\delta$ is the total damping constant comprising of thermal, radiation and viscous damping effects. The resonance frequency of the swimbladder is a function of the submergence depth D of fish, where D and a are in meters, and is given by, $$f_r = \frac{3.26}{a}\sqrt{1 + 0.0984D}. \qquad \text{(Eq. 13)}$$

With these equations, the resonance frequency, or equivalently fish depth, as well as bubble radius and total damping constant can be determined by direct acoustic measurements of the spectral peak in fish scattering across frequency, fish target strength, the spread of the resonance peak across frequency. They may also be determined by from prior knowledge, or from other suitable means such as local capture trawl data.

For fish without swimbladders, the body of the fish provides the main source of scattering as a volumetric inhomogeneity. The Rayleigh-Born scattering model described earlier can also be applied to analyze scattering from such fish. Most fish of interest at frequencies contemplated herein have body sizes that are small compared to the acoustic wavelength. Eq. 9 can be applied to derive the scatter function of an inhomogeneous fish body of volume $V_0$ as, $$S(r_t, f) = V_0 \frac{k^3}{4\pi}(\Gamma_\kappa + \eta \Gamma_d) \qquad \text{(Eq. 14)}$$

where $$\eta = \frac{k_i \cdot k}{k^2}$$

is the dot product of the incident and scattered wavevectors. This scatter function can be used in Eqs. 7 and 8 to provide the scattered field-intensity spectrum for fish due to scattering from their bodies, given the density and compressibility contrast of fish relative to water. Typically, the density and compressibility ratios for fish are well known a priori, making the primary variable the fish volume, which can be determined from acoustic target strength measurements.

3.3 Maximization of Fish Returns and Minimization of Returns from Boundary Reverberation Returns within the resolution footprint from fish modeled via Eqs. 7-8 and Eqs. 12-14 can be maximized, and those from other environmental scatterers such as seafloor inhomogeneities modeled via Eq. 11 can be minimized, by adjusting controllable parameters such as source frequency, source-receiver location, and source array spatial windowing. For example, scattering from the seafloor tends to increase more slowly with frequency than resonant scattering from fish with swimbladders, below the resonance peak, as can be inferred from Eqs. 11-14. Hence choosing the operational frequency near fish resonance can maximize fish returns and minimize those from seafloor scattering. Also, since seafloor scattering is highly dependent upon the depth of significant penetration of sound into the seafloor, as seen in the volume integral of Eq. 11 over the inhomogeneities causing the scattering, it can be advantageous to minimize seafloor scattering by stimulating lower-order modes that still fill the watercolumn, but do so at relatively shallow grazing angles and so do not penetrate as deeply into the seafloor. This can be accomplished by source array spatial windowing and placement of sources in shallower bathymetric locations, for example. Minimization of returns from seasurface roughness can be handled with the same equations analogously. Such returns are not typically significant except at very high sea states where seagoing research vessels typically tend not to operate.

4. Frequency Optimization

A wide range of transmission frequencies may be used, ranging from very low frequencies from several Hz to very high frequencies of tens of kHz. Long-range sound propagation in the ocean is less attenuated at lower frequencies and is less sensitive to oceanographic fluctuations. Also, reverberation from the seafloor tends to be lower at lower frequencies. Finally, the frequency range from 100 Hz to 3 kHz is particularly optimal for the present invention since it encompasses the swim-bladder resonance for many species of fish, where target strengths are high.

In practice, the optimal frequency or frequency band will be dictated by several factors. First, scattering from any fish is effectively omni-directional. In accordance with the present invention, an individual fish may be viewed from any direction (or many directions at once) and have the same target strength. There are no fluctuations in scattering due to changes in fish orientation as in CFFS. In particular, the fish generally will be larger than the wavelengths used in CFFS, and aspect-dependent fluctuations consequently cause errors in fish detection and abundance estimation. (Scatterers small compared to the acoustic wavelength are known as "acoustically compact" scatterers.)

The optimal wavelength is desirably large enough that the received acoustic field scattered from any given fish is expressible as the product of three factors—one for transmission to the given fish, one for scattering from the fish, and one for transmission from the fish. At CFFS wavelengths, this factorization is typically not possible in a waveguide remote sensing system because propagation and scattering effects are convolved together. Standard CFFS methods for removing transmission effects can then cause significant error when used for remote sensing in a waveguide at CFFS frequencies. The reason is that in a waveguide, there are no single incident and scattered directions as in free space, but rather many such directions in elevation angle. These arise from the multipath or multi-modal nature of waveguide propagation. If the scatterer is large compared to the wavelength, it will have a directional scattering pattern with many lobes. These may stimulate the modes differently, leading to convolved scattering and propagation, as is true at most CFFS frequencies. If the object scatters omni-directionally over the elevation angles spanned by the modes as in the present invention, the scattering can factor from propagation.

At the wavelengths utilized herein, and again in contrast to typical CFFS systems, acoustic attenuation due to propagation through the fish is negligible even over long ranges. This is because the extinction per unit volume due to scattering from fish is very small at such wavelengths. This is often not true for CFFS, where shorter wavelengths lead to attenuation through fish schools that can be significant and cause fading and shadowing of distant schools or distant parts of schools in the forward direction. This, in turn, can lead to significant errors in detection and abundance estimates.

The optimal acoustic wavelength $\lambda$ is also chosen such that the far-field range ($L^2/\lambda$) is shorter than the mean spacing between fish, where L is the length scale of the dominant scatterer within a fish, which may be the entire fish or just the swimbladder. This is often not true in CFFS frequencies, which can lead to multiple-scattering effects that impair inversion for fish population density.

The optimal wavelength will also be large enough that the shadow length from any individual fish or group of fish is smaller than the mean distance between the fish. This may not be true at CFFS frequencies and can lead to significant multiple-scattering effects that impair accurate detection of fish and inversion for fish population density. Again, in accordance with the present invention, sound is incident on a given fish from many elevation angles at once, and propagates back to the receiver after scattering into many elevation angles at once. The kind of shadowing caused by dense groups of fish in direct-path CFFS is then greatly reduced by the waveguide propagation contemplated herein. Furthermore, attenuation from absorption and scattering in the water and seabed from non-fish related properties of the medium increase with increasing frequency. At the transmission frequencies suitable for the present invention, which encompass both the optimal frequency for long-range waveguide propagation as well as the optimal frequency for remote waveguide imaging of fish, these attenuation effects are greatly reduced in comparison to CFFS frequencies. As well, scattering from the seafloor and seasurface tends to increase with increasing frequency, which can mask remote returns from fish as frequency increases into CFFS regimes; this is not a problem over the range of frequencies contemplated herein.

Another constraint on transmission wavelength is the need to support modal propagation. If the chosen wavelength is too large, the waveguide can no longer support modal propagation, so remote sensing becomes inefficient. Also, fish scattering levels will be reduced, but often so is interference from unwanted seafloor and seasurface scatterers.

Source power is also an important consideration, and is preferably chosen so that fish scattering stands above ambient noise level in the waveguide by 5 dB at the maximum range of detection for the given wavelength.

5 5. Variance Stabilization by Log-Transformation for Optimal Imaging Display and Pattern Recognition and Reducing Fluctuations Due to Random Scattering and Propagation Scintillation Scattering from random surfaces and volumes leads to randomness in the received field, as does propagation through the fluctuating ocean. Both of these forms of randomness lead, in turn, to fluctuations in the received acoustic scattered returns from the fish schools. The instantaneous received acoustic field returned from a group of fish, or the sea floor or sea surface, is a circular complex Gaussian random variable, as is the field transmitted through a fluctuating ocean waveguide. This is a consequence of the central limit theorem given the many random contributions to the field from fish, seafloor or seasurface scatterers, or propagation through the random ocean. The magnitude square of the instantaneous returned acoustic field, proportional to instantaneous intensity and for simplicity here defined as instantaneous intensity, then follows a negative exponential distribution. Consecutive pings produce statistically independent samples of the returned acoustic field from a group of fish within the resolution footprint of the system. Averaging independent samples of instantaneous intensity leads to the averaged intensity, which follows the gamma distribution. Both instantaneous intensity and averaged intensity have standard deviations proportional to the expected or mean intensity. This means that an intensity image of the environment has signal-dependent noise such that the standard deviation or error in intensity at any pixel is proportional to the mean, and so is larger where the mean is larger and smaller where the mean is smaller. The non-uniform standard deviation throughout the image is known as speckle noise.

It is generally not optimal to search for fish patterns in an image with signal-dependent noise because methods that remove noise will typically also remove information about the signal (since the noise depends on the signal). The log-transformation of averaged intensity is taken to address this problem. The log transform homomorphically transforms signal-dependent noise to signal-independent noise such that the standard deviation at each pixel in the image is constant and independent of the mean of the log-transformed averaged intensity. The variance is then stabilized throughout the image so that the standard deviation or error at each pixel is uniform throughout the log-transformed image, and is independent of the signal level (in dB) at each pixel. Standard correlation or matched filtering is then optimal for finding patterns of fish distributions within the log-transformed image. Averaging is done in intensity before log-transformation to reduce and effectively eliminate biases inherent in log-transformation.

The standard deviation at any pixel in an averaged intensity image is reduced by $1/\sqrt{N}$ from that of the instantaneous intensity (N=1 case) at that pixel, where N is the number of independent samples in the average. The averaged intensity will vary throughout the image, to produce a scene, as will the standard deviation of averaged intensity. The standard deviation of the log-transformed image in dB, however, is roughly the constant $4.3/\sqrt{N}$ for N>2 for every pixel in the image. By averaging both adjacent range bins and consecutive images, at, for example, N=10, a standard deviation of roughly 1.36 dB is obtained, which translates to a standard deviation of roughly 37% of the true population density at the given pixel. This percentage error is further reduced when total population is estimated as noted below.

5. Species Identification by Frequency Analysis

Different species of fish can have unique acoustic target strengths. The frequency dependence of these target strengths can be used to remotely identify species in accordance with the present invention. This can be achieved, for example, by sending a transmission over a distinct frequency band, forming a wide-area image of target strength per unit area for this transmission, and repeating the process immediately over a different frequency band. The separate transmissions can be sent within seconds of each other or simultaneously if the frequency content is non-overlapping. The difference in target strength per unit area by a pixel-to-pixel subtraction of any two images taken at approximately the same time will yield a spatial image of the difference in fish target strength per unit area for the different frequency bands of the two transmissions. Comparison of the differences, as well as absolute levels, are used to distinguish fish species at various locations in wide area images.

Social groupings of fish, such as schools and shoals, may be automatically detected and located in images obtained as described herein based on sound pressure level, target strength or population density. This may be accomplished by identifying all pixels in the image above a specified threshold with respect to the background level and contouring these high-level regions. The contours segment fish populations as regions of locally high sound pressure level, target strength or fish population density in a given image.

Indeed, image-processing module 330 may create wide-area movies of the evolution of fish populations as a concatenated sequence of images. The images may be based on sound pressure level, scattering strength and/or areal fish population density. The movies make it possible to quantitatively study the real-time behavior of fish populations, and to potentially identify species from observed behavior.

6. Areal Fish Population Density, Spatial Spectra, and Time Series of Population and Temporal Spectra and Correlation Scales Once the representative or mean target strength of an individual fish has been identified at a given location (from the frequency analysis described above, by direct trawl sampling or CFFS, or by prior knowledge), an image of the areal population density of the fish can be determined from the image of target strength at each pixel. This is accomplished by subtracting the mean target strength of an individual fish in that location from every pixel where that mean target strength was determined to be representative in the image.

Two-dimensional images of the spatial spectra of fish population density then may be obtained by taking the two-dimensional Fourier transform of an image of areal fish population density. The standard deviation at each pixel of the spectral images can be reduced by averaging statistically independent spectral images from consecutive pings. Log transformation can be used to stabilize the variance and to determine if power laws exist in the spectra that can be used for characterization and prediction of spatial distributions.

The total fish population in a given fish population-density image may be obtained by summing the values of each pixel and multiplying by the pixel area. Time series of fish population density are then generated by computing the total fish population for a temporal sequence of images. Besides total fish population, it is possible to determine fish population within a particular areal density range, or fish population within a given segmented school of fish or spatial region, by summing only the relevant pixels.

Since contributions from millions of fish from hundreds of independent pixels are added in these population estimates, fluctuations from propagation scintillation and variations in fish scattering cross-section should lead to errors of less than 1% of the estimated value for any given temporal population sample. (This is a consequence of the "law of large numbers." The percentage standard deviation of the total population is the ratio of the standard deviation to mean population density at a single pixel in an averaged image divided by the square root of the number of independent pixels summed to obtain the total population.)

7. Time Series of Fish School Area, Center of Population and Morphology

Data-analysis module 320 can characterize the total area occupied by a detected and segmented fish school by determining the number of pixels in a segmented school and multiplying by the pixel area. The center of population of the segmented school in a fish-population density image can be determined by finding the first moment of the horizontal position vector with respect to the spatially varying fish population density within the school. The principal axis and of the fish school's extent and its direction can be determined from the second central moment of the horizontal position vector within the school. These principal axes quantitatively characterize the school's morphology. Alternatively, the normalized two-dimensional autocorrelation function of an image of fish population density may be used to determine the area of coherence of a population center, where this coherence area may be defined by the nearest contour to the peak correlation at zero lag that has fallen to a given value, such as the convention 1/e. Time series of fish school area, center of population and morphology are generated by computing these quantities for a temporal sequence of images.

8. Fish Velocity Estimation by Differential Motion, Conservation of Mass, Environmental Pressures Estimated by Conservation of Momentum The absolute velocity vectors of an entire field of fish may also be determined by time differencing the population density and space differencing the mass flow as constrained by conservation of mass and, for example, minimization of kinetic energy in the fish flow field following Fermat's principle of least action. The environmental pressures on the fish causing them to move may also then be quantified using the equation of conservation of momentum and using the computed velocity field and the measured population density field. Low-pass filtering of the spatial population density data may be used to estimate higher velocities in the flow field.

The absolute velocities of fish groups may also be determined by time differencing the center of mass or spatial gradient for the given school with respect to charted returns from a target of fixed and known location. The relative velocities of fish centers of mass may be determined by time differencing the positions of the centers of mass.

9. Instantaneous Fish-school Velocity Estimation by Doppler

For bottom-moored sources and receivers that are well fixed to the seafloor, the mean instantaneous velocity of a fish school within the resolution footprint of the system and its variance may be determined by examining the mean and variance in the Doppler frequency shift of the scattered return. Suitable waveforms for determining the Doppler shift include windowed m-sequences, since these provide both high range resolution and high Doppler resolution for low-mach-number targets like fish. For a single source and receiver, only the radial component of velocity is determinable. For multi-static scenarios with multiple receivers and/or sources, both horizontal velocity components are determinable. Long-range fish velocity estimation from moving source-receiver systems is more difficult because motion of the platform can mask the Doppler signal from the fish.

10. Exemplary Results

A system in accordance with the present invention was used to survey the East Coast Continental Shelf of the United States 200 km south of Long Island, N.Y., near the shelf edge in May 2003 simultaneously with line-transect measurements made by CFFS. High spatial and temporal correlation was found between the Eularian system of the present invention and the Lagrangian CFFS system in detecting, imaging and charting both large and small fish schools. While the CFFS system had a 10-m diameter horizontal resolution footprint, the system of the present invention had a resolution of 15 m along the CFFS transect and roughly 2 degrees in azimuth across it, e.g. 350 m cross-range resolution at 10 km.

Many of the fish shoals co-registered in time and space by the two systems persisted over time in wide-area images before and after CFFS transection. This observed persistence was also exhibited in a purely spatial correspondence in detecting, imaging and charting fish schools by the two systems. After statistical analysis, it was found that at locations where the present system imaged features prominent enough to exceed background intensity by at least an order of magnitude, at a temporal repeatability rate exceeding 25% over the given day, CFFS always detected highly concentrated fish layers of at least 0.4 fish/$m^3$ areal density. These corresponded to very large and densely populated fish schools. No correlation was found between features in images generated in accordance herewith and those of the sub-bottom after extensive investigation and seafloor features on the shelf typically lacked sufficient relief to cause noticeable returns.

Fish population densities were continuously estimated over wide-areas from imagery generated in accordance herewith. The areal population densities are consistent with those obtained from CFFS over the same time period. Our population density estimates depend on the expected scattering cross section of an individual fish, which we find to have a corresponding target-strength of −45 dB in the 390-440 Hz band of our experiment. This follows from a combination of statistical modeling and empirical evidence gathered across species by trawl samples previously obtained in the same location and local simultaneous CFFS measurements of both volumetric and areal fish population density. Catches consisted of a variable component of Atlantic herring, scup, hake, black sea bass, dogfish and mackerel all of which have target strengths within an order of magnitude of each other in the 390-440 Hz band, which is near or just below swim-bladder resonance for many of these species. A standard deviation of less than 1-dB per pixel corresponds to an error of less than 25% in any intensity or population density estimate for the given pixel. Variations in the scattering cross-section of individual fish are expected to introduce a standard deviation of less than 1 dB for any pixel corresponding to a fish shoal, since a very large number of fish are summed in a corresponding resolution footprint of the present system. Transmission scintillation from randomness in the ocean medium due to such effects as internal waves and turbulence ultimately also introduces relatively little uncertainty in obtained images since a standard deviation of roughly 1 dB per pixel is expected after averaging over five consecutive instantaneous images and two adjacent range bins per image.

Time series of fish populations were generated by sampling at 50-second intervals. They covered the total fish population as well as the population above or below various significant areal density thresholds. The population contribution from moderate-to-low densities ($n_A < 0.2$ fish/$m^2$), apparently corresponding to small scattered fish groups, and the outskirts of large fish shoals, was relatively stable throughout the day and accounted for roughly ⅕ to ⅓ of the total fish population, and roughly 90% of the total area. A dramatic decrease in moderate-to-high-density populations ($n_A \geq 0.2$ fish/$m^2$) from roughly ⅘ to ½ of the total occurred in roughly hour-long events on two separate occasions. Fragmentation in the latter case was severe. A decrease in area occupied by moderate-to-high fish densities occurred with a corresponding increase in the area occupied by moderate-to-low density populations was observed. The loss of population is either due to fish leaving the survey area or dispersal of fish to below the 0.01 fish/$m^2$ density where seafloor scattering mechanisms dominate. The latter apparently masks fish returns over at most 30% of the area surveyed. This non-biologic mechanism still contributes to the areal density images in all other regions but is not included in population time series. Extremely high-density regions, with concentrations greater than 0.5 fish/m² account for less than 16% of the total population and less than 1% of the total area. Since contributions from millions of fish from hundreds of independent pixels were added in these population estimates, fluctuations from propagation scintillation and variations in fish scattering cross-section should lead to errors of less than 1% of the estimated value for any given temporal population sample.

The availability of temporally continuous imagery also makes it possible to quantitatively analyze the behavior and interaction of both large and small fish groups over very wide areas in an unprecedented manner. Data-analysis module 320 may utilize an automated procedure to segment, track and estimate the population and area of each of the individual fish groups found within a series of images. This facilitates study of the evolution and fragmentation of a fish school. First, individual schools are identified and segmented for moderate-to-high fish densities ($n_A > 0.2$ fish/m²). Time series of population, area, and population center are then generated for these groups.

The relative velocity of fish groups can also be remotely determined from imagery obtained in accordance herewith. A histogram of the differential speed between population centers may be generated for purposes of analysis. In our experiments, a mean separation rate of −0.30 m/s and standard deviation of 3.0 m/s were obtained, and these are consistent with speeds expected for individual fish. Extreme values in the histogram, of up to ±15 m/s, however, are likely apparent speeds resulting from abrupt fish density changes propagating like waves across a school.

One skilled in the art will realize the invention may be embodied in other specific forms without departing from the spirit or essential characteristics thereof. The foregoing embodiments are therefore to be considered in all respects illustrative rather than limiting of the invention described herein. Scope of the invention is thus indicated by the appended claims, rather than by the foregoing description, and all changes that come within the meaning and range of equivalency of the claims are therefore intended to be embraced therein.

The invention claimed is:

1. A method of characterizing a population of fish, the method comprising the steps of:
   a. generating, within an aquatic environment, horizontally directed acoustic signals via trapped modes whereby the signals undergo cylindrical spreading loss, the acoustic signals having frequencies that cause a fish to scatter the acoustic signals substantially omnidirectionally;
   b. receiving return acoustic signals, having a scatter function factorable therefrom, stimulated by the generated acoustic signals; and
   c. interpreting the return acoustic signals so as to detect and characterize the fish population.

2. The method of claim 1 wherein the generated acoustic signals are azimuthally uniform.

3. The method of claim 1 wherein the generated acoustic signals propagate within bounding geophysical features that act as a waveguide.

4. The method of claim 1 wherein the generated acoustic signals are pulsed.

5. The method of claim 1 wherein the interpreting step comprises temporal matched filtering and beamforming.

6. The method of claim 1 wherein the interpreting step comprises compensating for at least one of two-way waveguide transmission loss, resolution footprint, fish target strength, source power, and statistical fluctuations of waveguide propagation and scattering.

7. The method of claim 1 wherein the interpreting step comprises establishing a fish target strength and, based thereon, identifying return signals indicative of fish populations.

8. The method of claim 7 further comprising the steps of (i) establishing target strengths of different species of fish and (ii) distinguishing among different fish populations based on the established target strengths.

9. The method of claim 3 wherein at least some of the geophysical features produce variations in the watercolumn sound speed to generate a waveguide.

10. The method of claim 1 wherein the characterization occurs over a region having an area in excess of 25 km² in one minute.

11. The method of claim 1 wherein the generated acoustic signals propagate, and the return acoustic signals span, 360 degrees in azimuth.

12. The method of claim 1 wherein the generated acoustic signals are generated from a vertically oriented array of acoustic sources disposed within the aquatic environment.

13. The method of claim 1 further comprising the step of optimizing a wavelength of the generated acoustic signals.

14. The method of claim 13 wherein the optimized wavelength is large enough that the return acoustic signals are expressible as the product of (i) a factor representing waveguide transmission to the fish, (ii) a factor representing scattering from the fish, and (iii) a factor representing waveguide transmission from the fish.

15. The method of claim 13 wherein the optimized wavelength is such that a far-field range of the generated acoustic signals is shorter than a mean spacing between fish to be characterized.

16. The method of claim 13 wherein the optimized wavelength is such that a shadow length from fish to be characterized is smaller than the mean distance between the fish.

17. The method of claim 13 wherein the optimized wavelength and a power level of the generated acoustic signals are such that the return acoustic signals from the fish exceed an ambient noise level at a maximum detection range by at least 5 dB.

18. The method of claim 1 further comprising the step of generating images of the fish population based on the return acoustic signals.

19. The method of claim 18 further comprising the step of concatenating successive images into a movie.

20. The method of claim 1 further comprising the step of characterizing a total area occupied by a detected fish school.

21. The method of claim 20 further comprising identifying a center of population of the fish school.

22. The method of claim 21 further comprising detecting a velocity of the fish school by time differencing the identified center of population.

23. The method of claim 21 further comprising determining velocity vectors of a field of fish by time and space differencing following conservation of mass.

24. The method of claim 21 further comprising quantifying environmental pressures on fish causing them to move following conservation of momentum.

25. The method of claim 1 further comprising the step of estimating a velocity of a fish school based on a Doppler frequency shift of the return acoustic signals.

26. The method of claim 1 wherein the interpreting step comprises log-transformation of intensities of the return acoustic signals to convert return-signal-dependent speckle noise into return-signal-independent additive noise, thereby optimizing pattern recognition of fish target strength or population distributions.

27. The method of claim 1 wherein waveguide modes stimulated by the generated signals are optimized to maximize return acoustic signals from fish and to minimize return acoustic signals from the seafloor.

28. The method of claim 20 further comprising characterizing a total fish population within the area.

29. The method of claim 13 wherein the optimized wavelength is such that the return acoustic signals are independent of the aspect of any individual fish.

30. The method of claim 13 wherein the optimized wavelength is such that scattering from fish groups or other marine creatures exceeds seafloor scattering at a maximum detection range.

31. The method of claim 13 wherein the optimized wavelength is such that total acoustic attenuation caused by waveguide scattering from fish or fish groups is less than 1 dB.

32. Apparatus for characterizing a population of fish, the apparatus comprising:
   a. a transmission device for generating, within an aquatic environment, horizontally directed acoustic signals via trapped modes whereby the signals undergo cylindrical spreading loss, the acoustic signals having frequencies that cause a fish to scatter the acoustic signals substantially omnidirectionally;
   b. a receiver for receiving return acoustic signals, having a scatter function factorable therefrom, stimulated by the generated acoustic signals; and
   c. an analysis module for interpreting the return acoustic signals so as to detect and characterize the fish population.

33. The apparatus of claim 32 wherein the transmission device generates azimuthally uniform acoustic signals.

34. The apparatus of claim 32 wherein the generated acoustic signals are pulsed.

35. The apparatus of claim 32 wherein the analysis module interprets the return acoustic signals by temporal matched filtering and beamforming.

36. The apparatus of claim 32 wherein the analysis module is configured to compensate for at least one of two-way waveguide transmission loss, resolution footprint, fish target strength, source power, and statistical fluctuations of waveguide propagation and scattering.

37. The apparatus of claim 32 wherein the analysis module is configured to establish a fish target strength and, based thereon, to identify return signals indicative of fish populations.

38. The apparatus of claim 37 wherein the analysis module is further configured to (i) establish target strengths of different species of fish and (ii) distinguish among different fish populations based on the established target strengths.

39. The apparatus of claim 32 wherein the transmission device generates acoustic signals that propagate 360 degrees in azimuth.

40. The apparatus of claim 32 wherein the transmission device comprises a vertically oriented array of acoustic sources.

41. The apparatus of claim 32 wherein the transmission device is configured to optimize a wavelength of the generated acoustic signals.

42. The apparatus of claim 41 wherein the optimized wavelength is large enough that the return acoustic signals are expressible as the product of (i) a factor representing waveguide transmission to the fish, (ii) a factor representing scattering from the fish, and (iii) a factor representing waveguide transmission from the fish.

43. The apparatus of claim 41 wherein the optimized wavelength is such that a far-field range of the generated acoustic signals is shorter than a mean spacing between fish to be characterized.

44. The apparatus of claim 41 wherein the optimized wavelength is such that a shadow length from fish to be characterized is smaller than the mean distance between the fish.

45. The apparatus of claim 41 wherein the optimized wavelength and a power level of the generated acoustic signals are such that return acoustic signals from fish exceed an ambient noise level at a maximum detection range by at least 5 dB.

46. The apparatus of claim 32 further comprising an image-processing module for generating images of the fish population based on the return acoustic signals.

47. The apparatus of claim 46 wherein the image-processing module is configured to concatenate successive images into a movie.

48. The apparatus of claim 32 wherein the analysis module is configured to characterize a total area occupied by a detected fish school.

49. The apparatus of claim 48 wherein the analysis module is further configured to identify a center of population of the fish school.

50. The apparatus of claim 49 wherein the analysis module is further configured to detect a velocity of the fish school by time differencing the identified center of population.

51. The apparatus of claim 32 wherein the analysis module is configured to estimate a velocity of a fish school based on a Doppler frequency shift of the return acoustic signals.

52. The apparatus of claim 32 wherein the analysis module performs log-transformation of intensities of the return acoustic signals to convert return-signal-dependent speckle noise into return-signal-independent additive noise, thereby optimizing pattern recognition of fish target strength or population distributions.

53. The apparatus of claim 32 wherein the transmission device is optimized such that waveguide modes stimulated by the generated acoustic signals are optimized to maximize the return acoustic signals from the fish and to minimize the return acoustic signals from the seafloor.

54. The apparatus of claim 48 wherein the analysis module is further configured to characterize a total fish population within the area.

55. The apparatus of claim 41 wherein the optimized wavelength is such that the return acoustic signals are independent of the aspect of any individual fish.

56. The apparatus of claim 41 wherein the optimized wavelength is such that scattering from fish groups or other marine creatures exceeds seafloor scattering at a maximum detection range.

57. The apparatus of claim 41 wherein the optimized wavelength is such that total acoustic attenuation caused by waveguide scattering from fish or fish groups is less than 1 dB.

58. The apparatus of claim 32 wherein the analysis module is configured to characterize a total population of fish in a given area and the variations of the characterized population with time as time series of fish population within an areal population density range.

59. The apparatus of claim 32 wherein the analysis module is configured to characterize a temporal spectrum of fish population time series and an autocorrelation time-scale of population fluctuations.

60. The apparatus of claim 46 wherein the image-processing module is configured to establish a two-dimensional spatial spectrum of fish population and spatial correlation scale of a fish population center.

61. The apparatus of claim 46 wherein the image-processing module is configured to determine time series of the morphology of a fish group by determining major and minor axes thereof.

62. The apparatus of claim 46 wherein the image-processing module is configured to reduce a variance at each pixel by averaging independent temporal or spatial samples of an intensity of the received acoustic signal in proportion to the number of samples in the average.

63. The method of claim 1 wherein the acoustic signals are generated at frequencies below 10 kHz.

64. The method of claim 63 wherein the acoustic signals are generated at frequencies between 100 Hz and 3 kHz.

65. The method of claim 1 wherein the acoustic signals are generated at frequencies encompassing the swim-bladder resonance of fish.

66. The apparatus of claim 32 wherein the acoustic signals are generated at frequencies below 10 kHz.

67. The apparatus of claim 66 wherein the acoustic signals are generated at frequencies between 100 Hz and 3 kHz.

68. The apparatus of claim 32 wherein the acoustic signals are generated at frequencies encompassing the swim-bladder resonance of fish.

* * * * *